US012804684B2

(12) United States Patent
Mu

(10) Patent No.: US 12,804,684 B2
(45) Date of Patent: Nov. 17, 2026

(54) METHODS FOR DETERMINING CFR, AND COMMUNICATION DEVICE AND STORAGE MEDIUM

(71) Applicant: Beijing Xiaomi Mobile Software Co., Ltd., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 280 days.

(21) Appl. No.: 18/694,068

(22) PCT Filed: Sep. 30, 2021

(86) PCT No.: PCT/CN2021/122296
§ 371 (c)(1),
(2) Date: Mar. 21, 2024

(87) PCT Pub. No.: WO2023/050350
PCT Pub. Date: Apr. 6, 2023

(65) Prior Publication Data
US 2024/0397532 A1 Nov. 28, 2024

(51) Int. Cl.
*H04W 72/30* (2023.01)
*H04W 72/0453* (2023.01)
*H04W 76/27* (2018.01)

(52) U.S. Cl.
CPC ....... *H04W 72/30* (2023.01); *H04W 72/0453* (2013.01); *H04W 76/27* (2018.02)

(58) Field of Classification Search
CPC ............. H04W 72/30; H04W 72/0453; H04W 76/27; H04W 28/26; H04W 72/23;
(Continued)

(56) References Cited

U.S. PATENT DOCUMENTS

2013/0022011 A1 1/2013 Enomoto et al.
2013/0107116 A1 5/2013 Charbit et al.
(Continued)

FOREIGN PATENT DOCUMENTS

CN 102792749 A 11/2012
CN 109391426 A 2/2019
(Continued)

OTHER PUBLICATIONS

ISA State Intellectual Property Office of the People's Republic of China, International Search Report Issued in Application No. PCT/CN2021/122296, Apr. 15, 2022, WIPO, 4 pages.
OPPO.Discussion on support for Idle and Inactive state Ues, 3GPP TSG-RAN WG1 Meeting #105-e R1-2104761, May 27, 2021, 7 pages.
(Continued)

*Primary Examiner* — Tejis Daya
(74) *Attorney, Agent, or Firm* — Volpe Koenig

(57) ABSTRACT

Provided in the embodiments of the present disclosure is a method for determining a CFR for receiving an MBS. The method is performed by a terminal, and includes: determining the CFR for receiving the MBS in a non-radio resource control (non-RRC) connected mode; where a frequency location of the CFR corresponds to at least one of: a first frequency location determined based on a common control resource set (CORESET); or a second frequency location determined based on a downlink bandwidth part (BWP) configured for the terminal.

16 Claims, 9 Drawing Sheets

(58) Field of Classification Search
CPC ..... H04L 5/0005; H04L 5/001; H04L 5/0053; H04L 5/0094
See application file for complete search history.

(56) References Cited

U.S. PATENT DOCUMENTS

| | | | | |
|---|---|---|---|---|
| 2019/0372817 | A1 | 12/2019 | Geng et al. | |
| 2021/0250918 | A1 | 8/2021 | Liu et al. | |
| 2022/0124675 | A1* | 4/2022 | Liu | H04W 72/56 |
| 2022/0231818 | A1* | 7/2022 | Lee | H04L 5/0098 |
| 2022/0232609 | A1* | 7/2022 | Lee | H04W 72/569 |
| 2022/0303892 | A1* | 9/2022 | Awadin | H04W 52/0216 |
| 2022/0312151 | A1* | 9/2022 | Yerramalli | G06N 3/0499 |
| 2022/0360360 | A1* | 11/2022 | Awadin | H04L 1/0002 |

FOREIGN PATENT DOCUMENTS

| | | | |
|---|---|---|---|
| CN | 110366261 | A | 10/2019 |
| CN | 114009111 | A | 2/2022 |
| WO | 2012046252 | A2 | 4/2012 |

OTHER PUBLICATIONS

Vivo.Discussion on basic functions for broadcast/multicast for RRC_IDLE/RRC_INACTIVE Ues, 3GPP TSG RAN WG1 #106-e R1-2106625,Aug. 27, 2021, 4 pages.
FUturewei.Group Scheduling Aspects for Connected Ues,3GPP TSG RAN WG1 #106-e R1-2107093, Aug. 27, 2021, 8 pages.
ZTE, Nokia, Nokia Shanghai Bell, Qualcomm, vivo, Convida Wireless, "Discussion on CFR configuration for Rel-17 MBS", RP-212414, 3GPP TSG RAN Meeting #93-e, Electronic Meeting, Sep. 13-17, 2021, 4 pages.
Nokia, Nokia Shanghai Bell, "CR to TS 38.141-1: Introduction of NB-IoT operation in NR channel bandwidth", R4-2000672, 3GPP TSG-RAN WG4 Meeting #94-e, Online, Feb. 24-Mar. 6, 2020, 45 pages.
State Intellectual Property Office of the People's Republic of China, Office Action and Search Report Issued in Application No. 2021800031756, Oct. 26, 2024, 14 pages.
ISA State Intellectual Property Office of the People's Republic of China, Written Opinion of the International Searching Authority Issued in Application No. PCT/CN2021/122296, Apr. 15, 2022, WIPO, 6 pages.

* cited by examiner

METHODS FOR DETERMINING CFR, AND COMMUNICATION DEVICE AND STORAGE MEDIUM

CROSS REFERENCE TO RELATED APPLICATIONS

This application is a U.S. national phase application of International Application No. PCT/CN2021/122296, filed on Sep. 30, 2021, the disclosure of which is incorporated herein by reference in its entirety for all purposes.

TECHNICAL FIELD

The present disclosure relates to the technical field of wireless communication, but is not limited to the technical field of wireless communication, and in particular to a method and an apparatus for determining a common frequency resource (CFR) for receiving a multicast and broadcast service (MBS), a communication device, and a storage medium.

BACKGROUND

Multicast and broadcast services (MBSs) have been introduced in new radio (NR). To facilitate channel transmission of the MBS, a common frequency resource (CFR) is defined. Relevant channel configuration and transmission of the MBS are performed based on the CFR.

In related technologies, in the scenario of transmission based on the CFR, the determination of the CFR may be unclear, which can directly lead to low resource utilization on a network side or high terminal power consumption.

SUMMARY

Embodiments of the present disclosure disclose methods and apparatuses for determining a common frequency resource (CFR) for transmitting a multicast and broadcast service (MBS), a communication device, and a storage medium.

According to a first aspect of the embodiments of the present disclosure, there is provided a method for determining the CFR for receiving the MBS, performed by a terminal. The method includes determining the CFR for receiving the MBS in a non-radio resource control (non-RRC) connected mode; where a frequency location of the CFR corresponds to at least one of a first frequency location determined based on a common control resource set (CORESET) or a second frequency location determined based on a downlink bandwidth part (BWP) configured for the terminal.

According to a second aspect of the embodiments of the present disclosure, there is provided a method for determining a common frequency resource (CFR) for sending a multicast and broadcast service (MBS), performed by a base station. The method includes determining the CFR for sending the MBS in a non-radio resource control (non-RRC) connected mode; where a frequency location of the CFR corresponds to at least one of a first frequency location determined based on a common control resource set (CORESET) or a second frequency location determined based on a downlink bandwidth part (BWP) configured for a terminal.

According to a third aspect of the embodiments of the present disclosure, there is provided a communication device, including one or more processors and a memory configured to store instructions executable by the one or more processors. The processors are configured to execute the instructions to perform the method according to any embodiment of the present disclosure.

According to a fourth aspect of the embodiments of the present disclosure, there is provided a computer storage medium storing a computer executable program which, when executed by a processor, implements the method according to any one of the embodiments of the present disclosure.

DETAILED DESCRIPTION OF THE EMBODIMENTS

Exemplary embodiments will be illustrated herein in detail, examples of which are illustrated in the accompanying drawings. When the following description refers to the drawings, unless otherwise indicated, the same numbers in different drawings indicate the same or similar elements. Implementations described in the following exemplary embodiments do not represent all implementations consistent with the embodiments of the present disclosure. Rather, they are merely examples of apparatuses and methods consistent with some aspects of embodiments of the present disclosure as detailed in the appended claims.

The terms used in the present disclosure are for the purpose of describing particular examples only, and are not intended to limit the present disclosure. Terms "a" and "the" in their singular forms in the examples of the present disclosure and the appended claims are also intended to include their plural forms, unless clearly indicated otherwise in the context. It should also be understood that the term "and/or" as used in the description refers to and includes any and all possible combinations of one or more of the associated listed items.

It is to be understood that, although the terms "first", "second", "third", and the like may be adopted in the examples of the present disclosure to describe various information, the information should not be limited to these terms. These terms are only used to distinguish the information of the same type from each other. For example, without departing from the scope of the present disclosure, first information may be referred to as second information; and similarly, second information may also be referred to as first information. Depending on the context, the word "if" as used herein may be interpreted as "when", "upon", or "in response to determining".

For the purpose of brevity and ease of understanding, the term "greater than" or "less than" is used herein when characterizing the relationship of magnitudes. However, for those skilled in the art, it can be understood that the term "greater than" also covers the meaning of "greater than or equal to", and the term "less than" also covers the meaning of "less than or equal to".

Figure 1:
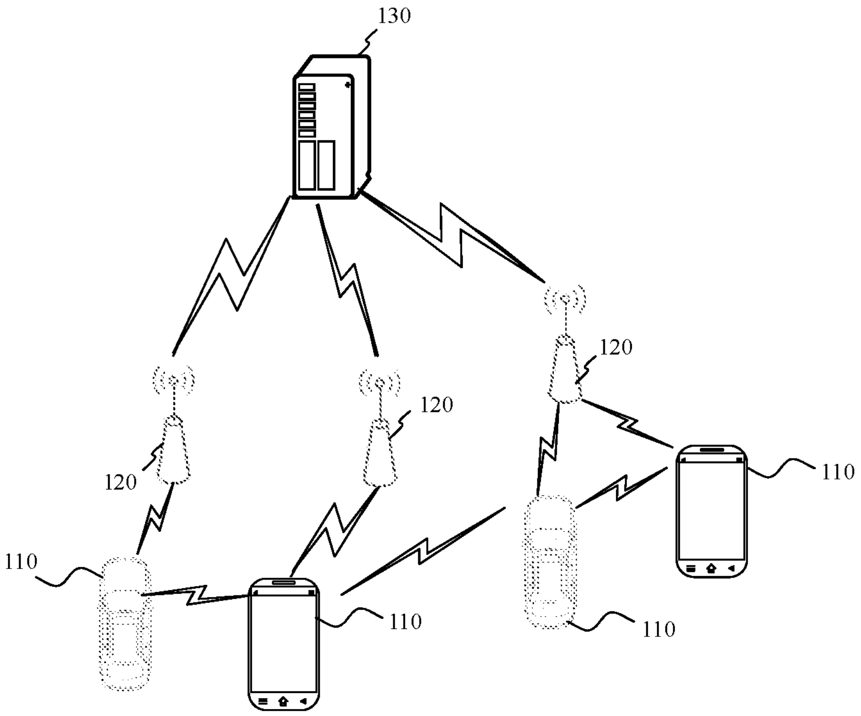
FIG. 1 is a schematic structural diagram illustrating a wireless communication system according to an exemplary embodiment.

Referring to FIG. 1, it illustrates a schematic structural diagram of a wireless communication system in an embodiment of the present disclosure. As shown in FIG. 1, the wireless communication system is a communication system based on mobile communication technologies. The wireless communication system can include several user equipment (UEs) 110 and several base stations 120.

The user equipment 110 can be a device that provides voice and/or data connectivity to a user. The user equipment 110 can communicate with one or more core networks via a radio access network (RAN). The user equipment 110 can be an Internet of Things (IoT) user equipment such as a sensor device, a mobile phone, and a computer with the IoT user equipment such as a fixed, portable, pocket-sized, handheld, built-in computer or vehicle-mounted device, for example, station (STA), subscriber unit, subscriber station, mobile station, mobile, remote station, access point, remote terminal, access terminal, user terminal, user agent, user device, or user equipment. Or, the user equipment 110 can also be a device of an unmanned aircraft. Or, the user equipment 110 can also be a vehicle-mounted device, for example, a trip computer having a wireless communication function or a wireless communication device connected to an external trip computer. Or, the user equipment 110 can also be a roadside device, for example, a street lamp, a signal lamp, or another roadside device, having the wireless communication function.

The base station 120 can be a network-side device in the wireless communication system. The wireless communication system may be the 4th generation mobile communication (4G) system, also known as the long-term evolution (LTE) system. The wireless communication system can also be the 5th generation mobile communication (5G) system, also known as the new radio (NR) system or 5G NR system. Or, the wireless communication system can also be a next-generation system of the 5G system. The access network in the 5G system can be called the new generation-radio access network (NG-RAN).

The base station 120 can be an evolved base station (eNB) adopted in the 4G system. Or, the base station 120 can also be a base station (gNB) adopting a centralized and distributed architecture in the 5G system. When the base station 120 adopts the centralized and distributed architecture, it generally includes a central unit (CU) and at least two distributed units (DUs). The CU is provided with a protocol stack of a packet data convergence protocol (PDCP) layer, a radio link control (RLC) layer, and a media access control (MAC) layer. The DU is provided with a protocol stack having a physical (PHY) layer. The specific implementation manner of the base station 120 is not limited in the embodiments of the present disclosure.

A wireless link can be established between the base station 120 and the terminal 110 through a wireless air interface. In different embodiments, the wireless air interface is a wireless air interface based on the 4G standard. Or, the wireless air interface is a wireless air interface based on the 5G standard, for example, the wireless air interface is an NR. The wireless air interface can also be a wireless air interface based on the next-generation mobile communication network technology standard of 5G.

In some embodiments, an end-to-end (E2E) link can also be established between the user equipment 110, for example, a vehicle-to-vehicle (V2V) communication, a vehicle-to-infrastructure (V2I) communication, and a vehicle-to-pedestrian (V2P) communication, in a vehicle-to-everything (V2X) communication.

The above-mentioned user equipment can be regarded as the terminal device of the following embodiments.

In some embodiments, and as shown in FIG. 1, the wireless communication system can also include a network management device 130.

The base stations 120 are connected to the network management device 130, respectively. The network management device 130 can be a core network device in the wireless communication system. For example, the network management device 130 may be a mobility management entity (MME) of an evolved packet core (EPC). The network management device 130 can also be other core network devices, such as a serving gateway (SGW), a public data network gateway (PGW), a policy and charging rules function (PCRF) unit, or a home subscriber server (HSS). The implementation form of the network management device 130 is not limited to the embodiments of the present disclosure.

In order to facilitate those skilled in the art to understand, the embodiments of the present disclosure enumerate implementation manners to clearly illustrate the technical solutions of the embodiments of the present disclosure. Of course, those skilled in the art can understand that the embodiments provided in the present disclosure can be executed independently, or can be combined with the methods of other embodiments of the present disclosure to be executed together, or can be executed together with some methods in other related technologies after being executed alone or being combined, which is limited in the embodiments of the present disclosure.

In order to better understand the technical solution disclosed in the embodiments of the present disclosure, relevant application scenarios are described.

In the 4th generation mobile communication (4G) system with a long term evolution (LTE) network, two technologies, namely machine type communication (MTC) and narrow band Internet of thing (NB-IoT), are proposed to support IoT services. These two technologies are mainly aimed at low-rate and high-latency scenarios, for example, meter reading and environmental monitoring scenarios. In related technologies, NB-IoT can only support a maximum rate of several hundred k, and MTC can only support a maximum rate of several M at present. However, on the other hand, with the continuous development of IoT services, for example, the popularity of video surveillance, smart home, wearable devices, industrial sensor monitoring, and other services, these services generally require rates ranging from tens to 100M, and also have relatively high latency requirements. Therefore, MTC and NB-IoT technologies in LTE are difficult to meet the requirements. Based on this situation, it is proposed to design a new user equipment in 5G new radio (NR) to cover the requirements of this mid-level IoT device. This new terminal type is referred to as a reduced-capability UE, or an NR-lite.

Similar to IoT devices in LTE, a 5G NR-lite generally needs to meet the requirements of being low cost and low complexity, providing a certain degree of coverage enhancement, and providing power saving.

Since the new radio (NR) is designed for high-level terminals such as terminals with high rate and low latency, the relevant design cannot meet the above requirements of the NR-lite. Therefore, the NR system needs to be modified to meet the requirements of the NR-lite. For example, in order to meet the requirement of low cost and low complexity, a RF bandwidth of an NR-IoT can be limited, such as to 5M Hz or 10M Hz. Or a size of a cache buffer of the NR-lite is limited, thereby limiting the size of each received transmission block. For power saving, possible optimization directions include simplifying communication processes and reducing the number of times NR-lite users detect downlink control channels.

MBS is a multicast and broadcasting service in the NR system. In standardization, a common frequency resource (CFR) is defined to facilitate the transmission of the physical downlink control channel (PDCCH) or physical downlink shared channel (PDSCH) related to the MBS. That is, the configuration and transmission of PDCCH/PDSCH related to the MBS are performed based on the CFR.

In an embodiment, for a terminal in a non-radio resource control (non-RRC) connected mode, the terminal can use a frequency resource corresponding to a common control resource set (CORESET) #0 as the CFR. The reason for using CORESET #0 as the basis for CFR configuration is that the terminal monitors a bandwidth part (BWP) in the non-RRC connected mode.

In an embodiment, in a reduced capability (Redcap) terminal, considering factors such as terminal bandwidth limitations and center frequency allocation in a time division system, an initial UL/DL BWP will be defined for the RedCap terminal. In this way, the RedCap terminal can monitor this initial DL BWP. The terminal can receive paging messages on this BWP.

In an embodiment, for the RedCap terminal, based on configuration or certain preset rules, the terminal can monitor CORESET #0 or the initial DL BWP in the non-RRC connected mode. It can be known that the manner or frequency of the location where the RedCap terminal monitors is different from that of a non-RedCap terminal. How to configure CFR for an MBS of the RedCap should be considered.

Figure 2:
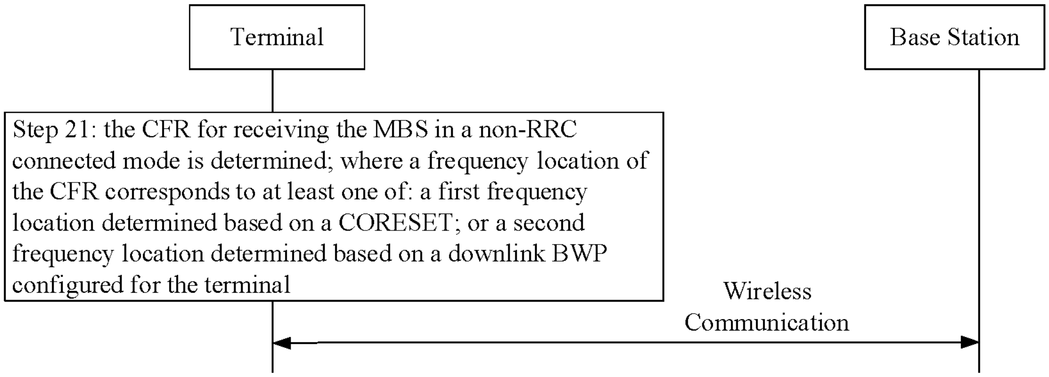
FIG. 2 is a flowchart illustrating a method for determining a CFR for transmitting MBS according to an exemplary embodiment.

As shown in FIG. 2, in this embodiment, a method for determining a CFR for receiving an MBS is provided, performed by a terminal. The method includes step 21.

In step 21, the CFR for receiving the MBS in a non-RRC connected mode is determined.

A frequency location of the CFR corresponds to at least one of the following frequency locations: a first frequency location determined based on a common control resource set (CORESET) or a second frequency location determined based on a downlink bandwidth part (BWP) configured for the terminal.

In an embodiment, the CFR for receiving the MBS in the non-RRC connected mode is determined.

The frequency location of the CFR corresponds to the first frequency location determined based on the CORESET and/or the second frequency location determined based on the downlink BWP.

Herein, the terminal can be, but is not limited to, a mobile phone, a tablet computer, a wearable device, a vehicle-mounted terminal, a roadside unit (RSU), a smart home terminal, an industrial sensing device, and/or a medical device. For example, the smart home terminal can include a camera, a temperature acquisition device, a brightness acquisition device, and the like. The terminal can be a RedCap terminal.

Herein, the base station involved in the present disclosure can be a base station of various types, such as a base station of the third generation mobile communication (3G) network, a base station of the fourth generation mobile communication (4G) network, a base station of the fifth generation mobile communication (5G) network, or other evolved base station.

In a scenario embodiment, after determining the CFR, the terminal can report the CFR to the base station, where the CFR can be used for the base station to send the MBS.

Herein, the first frequency location is a location determined based on the CORESET. The second frequency location is a location determined based on the downlink BWP.

In an embodiment, the CFR for receiving the MBS in the non-RRC connected mode can be determined from at least one of the first frequency location determined based on the CORESET and the second frequency location determined based on the downlink BWP configured by the base station for the terminal. It should be noted that the frequency location of the determined CFR can be the first frequency location, the second frequency location, a combination of a part in the first frequency location and a part in the second frequency location, or another frequency location associated with the first frequency location and/or the second frequency location. In summary, the frequency location of the CFR is determined based on the first frequency location and the second frequency location, which is not limited herein.

Herein, the non-RRC connected mode can include a RRC idle state and/or a RRC inactive state, but is not limited to the RRC idle state and/or the RRC inactive state. Herein, as the evolution of the network, the non-RRC connected mode can be any state in which no RRC connection is established between the terminal and the base station.

In an embodiment, the CFR for receiving the MBS in the RRC idle state is determined. The MBS is received on the CFR.

In an embodiment, the CFR for receiving the MBS in the RRC inactive state is determined. The MBS is received on the CFR.

Herein, the CORESET for determining the first frequency location can be determined from a plurality of CORESETs. For example, CORESET #0 is determined to be the CORESET for determining the first frequency location from CORESET #0, CORESEET #1, and CORESET #2. It should be noted that the CORESET for determining the first frequency location can be indicated by network configuration, can be configured by default (for example, specified by a predetermined protocol), or can be determined by the terminal based on its own behavior, which is not limited herein.

In an embodiment, based on the determination of whether the network is configured with the second frequency location, the CFR for receiving the MBS in the non-RRC connected mode is determined. The frequency location of the CFR corresponds to the first frequency location determined based on the CORESET and/or the second frequency location determined based on the downlink BWP configured by the base station for the terminal.

In an embodiment, in response to the network not being configured with the second frequency location, it is determined that the frequency location of the CFR for receiving the MBS in the non-RRC connected mode is the first frequency location. The terminal receives the MBS at the first frequency location.

In an embodiment, in response to the network being configured with the second frequency location, the CFR for receiving the MBS in the non-RRC connected mode is determined based on a configured frequency resource monitored by the terminal in the non-RRC connected mode. Herein, the CFR for receiving the MBS in the non-RRC connected mode can be determined according to whether the network is configured with the frequency resource monitored by the terminal in the non-RRC connected mode.

In an embodiment, in response to the frequency resource monitored by the terminal in the non-RRC connected mode not being configured, it is determined that the frequency location of the CFR for receiving the MBS in the non-RRC connected mode is the first frequency location. The terminal receives the MBS at the first frequency location.

In an embodiment, in response to the frequency resource monitored by the terminal in the non-RRC connected mode being configured, it is determined that the frequency location of the CFR for receiving the MBS in the non-RRC connected mode is the second frequency location. The terminal receives the MBS at the second frequency location.

In an embodiment, in response to the second frequency location being configured, the CFR for receiving the MBS in the non-RRC connected mode is determined based on an indication of predetermined signaling. Herein, the CFR for receiving the MBS in the non-RRC connected mode can be determined based on a type of predetermined information carried by the predetermined signaling. In some possible implementations, in response to the predetermined signaling carrying first information, it is determined that the frequency location of the CFR for receiving the MBS in the non-RRC connected mode is the first frequency location. The terminal receives the MBS at the first frequency location.

In an embodiment, in response to the predetermined signaling carrying second information, it is determined that the frequency location of the CFR for receiving the MBS in the non-RRC connected mode is the second frequency location. The terminal receives the MBS at the second frequency location. Herein, the CFR for receiving the MBS in the non-RRC connected mode can be determined based on whether the predetermined signaling carries predetermined information. In an embodiment, in response to the predetermined signaling not carrying the predetermined information, it is determined that the frequency location of the CFR for receiving the MBS in the non-RRC connected mode is the first frequency location or the second frequency location. The terminal can receive the MBS at the first frequency location or the second frequency location.

In an embodiment, in response to the second frequency location being configured, the CFR for receiving the MBS in the non-RRC connected mode is determined based on an uplink BWP where a physical uplink control channel (PUCCH) carrying a hybrid automatic repeat request (HARQ) feedback corresponding to the MBS is located. Herein, in response to there being an uplink HARQ feedback in downlink transmission of the MBS, it can be determined that the frequency location of the CFR for receiving the MBS in the non-RRC connected mode is the second frequency location. The second frequency location is a location with the same center frequency as the uplink BWP.

In the embodiment of the present disclosure, the CFR for receiving the MBS in the non-RRC connected mode is determined, where the frequency location of the CFR corresponds to at least one of the following frequency locations: the first frequency location determined based on the CORESET, or the second frequency location determined based on the downlink BWP configured for the terminal. In this way, the frequency location of the CFR can be clearly determined based on the first frequency location and/or the second frequency location. Compared with the way in which the frequency location of the CFR cannot be clearly determined, on the one hand, the resource utilization rate on the network side can be improved; on the other hand, power consumption caused by the terminal determining the resource location of the CFR can be reduced.

It should be noted that those skilled in the art can understand that the method provided in the embodiment of the present disclosure can be executed independently, or can be executed together with some methods in the embodiments of the present disclosure or related technologies.

Figure 3:
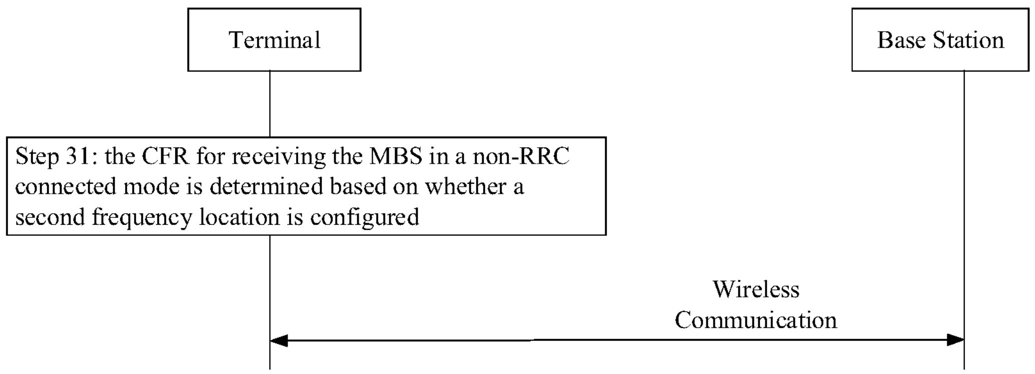
FIG. 3 is a flowchart illustrating a method for determining a CFR for transmitting MBS according to an exemplary embodiment.

As shown in FIG. 3, in this embodiment, a method for determining a CFR for receiving an MBS is provided, performed by a terminal. The method includes step 31.

In step 31, the CFR for receiving the MBS in a non-RRC connected mode is determined based on whether a second frequency location is configured.

Herein, the second frequency location is a location determined based on a downlink (DL) BWP.

In an embodiment, in response to the network not being configured with the second frequency location, it is determined that the frequency location of the CFR for receiving the MBS in the non-RRC connected mode is the first frequency location. The terminal receives the MBS at the first frequency location.

In an embodiment, in response to the network being configured with the second frequency location, the CFR for receiving the MBS in the non-RRC connected mode is determined based on a configured frequency resource monitored by the terminal in the non-RRC connected mode. Herein, the frequency resource monitored by the terminal in the non-RRC connected mode can indicate that the frequency resource monitored by the terminal in the non-RRC connected mode is configured or that the frequency resource monitored by the terminal in the non-RRC connected mode is not configured.

In an embodiment, in response to the frequency resource monitored by the terminal in the non-RRC connected mode not being configured, it is determined that the frequency location of the CFR for receiving the MBS in the non-RRC connected mode is the first frequency location. The terminal receives the MBS at the first frequency location. In some possible embodiments, in response to the frequency resource monitored by the terminal in the non-RRC connected mode being configured, it is determined that the frequency location of the CFR for receiving the MBS in the non-RRC connected mode is the second frequency location. The terminal receives the MBS at the second frequency location.

In this way, when receiving an MBS downlink service, the terminal does not need to switch back and forth between the first frequency location and the second frequency location, which can save the power consumption of the terminal and improve the endurance time of the terminal.

In an embodiment, in response to the second frequency location being configured, the CFR for receiving the MBS in the non-RRC connected mode is determined based on an indication of predetermined signaling. Herein, the predetermined signaling can carry different types of predetermined information or no predetermined information. Herein, the predetermined information can be first information or second information.

In an embodiment, in response to the predetermined signaling carrying the first information, it is determined that the frequency location of the CFR for receiving the MBS in the non-RRC connected mode is the first frequency location. The terminal receives the MBS at the first frequency location. Or, in response to the predetermined signaling carrying the second information, it is determined that the frequency location of the CFR for receiving the MBS in the non-RRC connected mode is the second frequency location. The terminal receives the MBS at the second frequency location.

In another embodiment, in response to the predetermined signaling not carrying the predetermined information, it is determined that the frequency location of the CFR for receiving the MBS in the non-RRC connected mode is the first frequency location or the second frequency location. The terminal can receive the MBS at the first frequency location or the second frequency location. In this way, the flexibility of the network is increased. When the network wants to obtain high resource utilization, the CFR can be configured at the first frequency location. In this way, a RedCap terminal and a non-RedCap terminal can share the same frequency location of the CFR. When the network controls the terminal to save energy, the frequency location of the CFR can be configured at the same frequency as the location monitored by the terminal, so as to avoid the terminal from switching between different BWPs, save power consumption of the terminal, and improve the endurance time of the terminal.

In an embodiment, in response to the second frequency location being configured, the CFR for receiving the MBS in the non-RRC connected mode is determined based on an uplink (UL) BWP where a physical uplink control channel (PUCCH) carrying a hybrid automatic repeat request (HARQ) feedback corresponding to the MBS is located. Herein, in response to there being an uplink HARQ feedback in downlink transmission of the MBS, it can be determined that the frequency location of the CFR for receiving the MBS in the non-RRC connected mode is the second frequency location. The second frequency location is a location with the same center frequency as the uplink BWP. In this way, in the TDD system, it is ensured that UL BWP and DL BWP have the same center frequency. The same center frequency can reduce the need to switch the center frequency when the terminal switches between uplink and downlink, thereby saving power consumption of the terminal and improving the endurance time of the terminal.

In an embodiment of the present disclosure, the CFR for receiving the MBS in the non-RRC connected mode can be adapted to the second frequency location, so that the network configuration is more flexible.

It should be noted that those skilled in the art can understand that the method provided in the embodiment of the present disclosure can be executed independently, or can be executed together with some methods in the embodiments of the present disclosure or related technologies.

Figure 4:
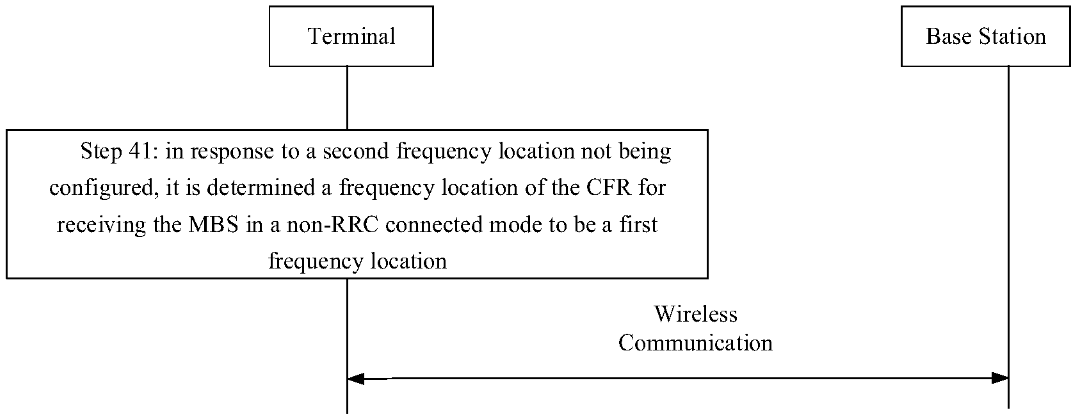
FIG. 4 is a flowchart illustrating a method for determining a CFR for transmitting MBS according to an exemplary embodiment.

As shown in FIG. 4, in this embodiment, a method for determining a CFR for receiving an MBS is provided, performed by a terminal. The method includes step 41.

In step 41, in response to a second frequency location not being configured, it is determined that a frequency location of the CFR for receiving the MBS in a non-RRC connected mode is a first frequency location.

Herein, the first frequency location is a location determined based on a common control resource set (CORESET). The second frequency location is a location determined based on a downlink bandwidth part (BWP) configured by a base station for the terminal.

It should be noted that those skilled in the art can understand that the method provided in the embodiment of the present disclosure can be executed independently, or can be executed together with some methods in the embodiments of the present disclosure or related technologies.

Figure 5:
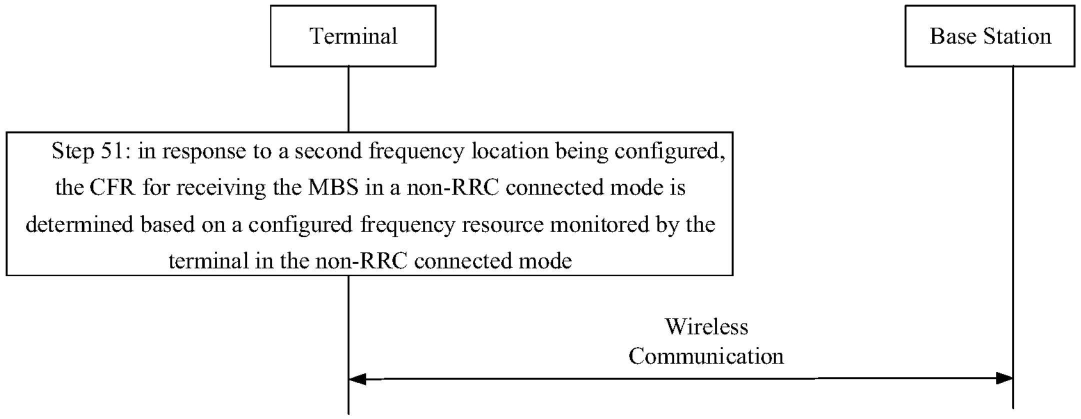
FIG. 5 is a flowchart illustrating a method for determining a CFR for transmitting MBS according to an exemplary embodiment.

As shown in FIG. 5, in this embodiment, a method for determining a CFR for receiving an MBS is provided, performed by a terminal. The method includes step 51.

In step 51, in response to a second frequency location being configured, the CFR for receiving the MBS in a non-RRC connected mode is determined based on a configured frequency resource monitored by the terminal in the non-RRC connected mode.

Herein, the second frequency location is a location determined based on a downlink bandwidth part (BWP).

In an embodiment, in response to the frequency resource monitored by the terminal in the non-RRC connected mode not being configured, it is determined that the frequency location of the CFR for receiving the MBS in the non-RRC connected mode is the first frequency location. The terminal receives the MBS at the first frequency location. In some possible embodiments, in response to the frequency resource monitored by the terminal in the non-RRC connected mode being configured, it is determined that the frequency location of the CFR for receiving the MBS in the non-RRC connected mode is the second frequency location. The terminal receives the MBS at the second frequency location.

In this way, when receiving an MBS downlink service, the terminal does not need to switch back and forth between the first frequency location and the second frequency location, which can save the power consumption of the terminal and improve the endurance time of the terminal.

It should be noted that those skilled in the art can understand that the method provided in the embodiment of the present disclosure can be executed independently, or can be executed together with some methods in the embodiments of the present disclosure or related technologies.

Figure 6:
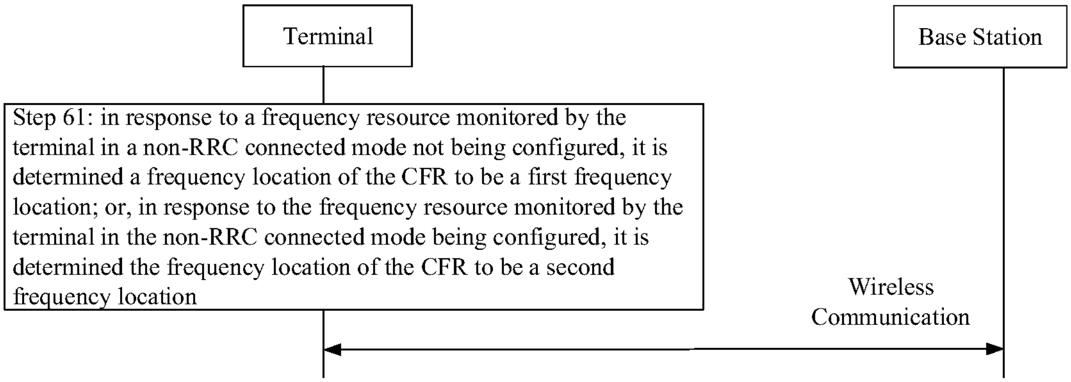
FIG. 6 is a flowchart illustrating a method for determining a CFR for transmitting MBS according to an exemplary embodiment.

As shown in FIG. 6, in this embodiment, a method for determining a CFR for receiving an MBS is provided, performed by a terminal. The method includes step 61.

In step 61, in response to a frequency resource monitored by the terminal in a non-RRC connected mode not being configured, it is determined that a frequency location of the CFR for receiving the MBS in the non-RRC connected mode is a first frequency location or in response to the frequency resource monitored by the terminal in the non-RRC connected mode being configured, it is determined that the frequency location of the CFR for receiving the MBS in the non-RRC connected mode is a second frequency location.

Herein, the first frequency location is a location determined based on a common control resource set (CORESET). The second frequency location is a location determined based on a downlink bandwidth part (BWP).

In an embodiment, it is determined whether the frequency resource monitored by the terminal in the non-RRC connected mode is configured. In response to the frequency resource monitored by the terminal in the non-RRC connected mode not being configured, it is determined that the frequency location of the CFR for receiving the MBS in the non-RRC connected mode is the first frequency location. The terminal receives the MBS at the first frequency location. Or, in response to the frequency resource monitored by the terminal in the non-RRC connected mode being configured, it is determined that the frequency location of the CFR for receiving the MBS in the non-RRC connected mode is the second frequency location. The terminal receives the MBS at the second frequency location. In this way, when receiving an MBS downlink service, the terminal does not need to switch back and forth between the first frequency location and the second frequency location, which can save the power consumption of the terminal and improve the endurance time of the terminal.

It should be noted that those skilled in the art can understand that the method provided in the embodiment of the present disclosure can be executed independently, or can be executed together with some methods in the embodiments of the present disclosure or related technologies.

Figure 7:
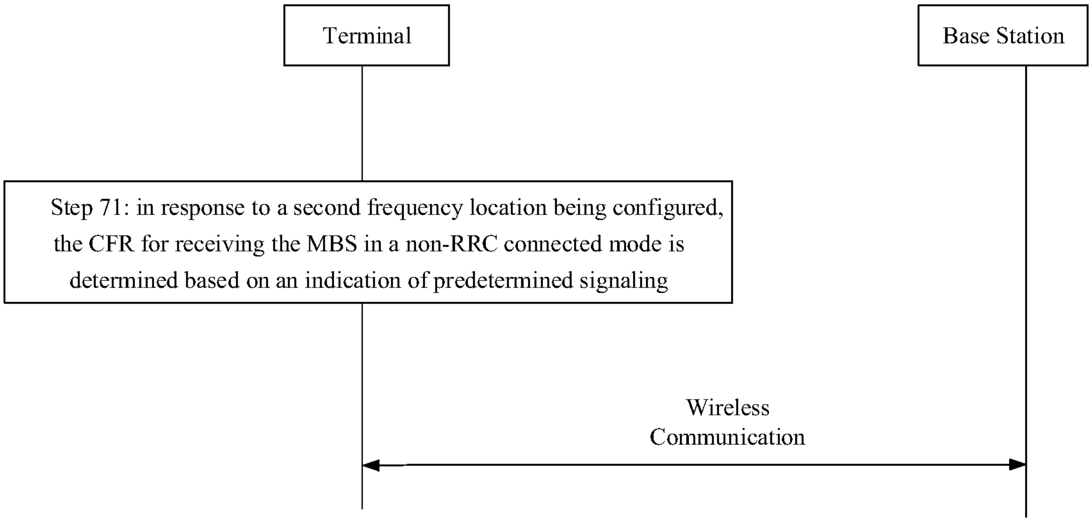
FIG. 7 is a flowchart illustrating a method for determining a CFR for transmitting MBS according to an exemplary embodiment.

As shown in FIG. 7, in this embodiment, a method for determining a CFR for receiving an MBS is provided, performed by a terminal. The method includes step 71.

In step 71, in response to a second frequency location being configured, the CFR for receiving the MBS in a non-RRC connected mode is determined based on an indication of predetermined signaling.

Herein, the second frequency location can be a location determined based on a downlink bandwidth part (BWP).

In an embodiment, in response to the second frequency location being configured, the CFR for receiving the MBS in the non-RRC connected mode is determined based on an indication of predetermined signaling. Herein, the predetermined signaling can carry different types of predetermined information or no predetermined information. Herein, the predetermined information can be first information or second information.

In an embodiment, in response to the predetermined signaling carrying the first information, it is determined that the frequency location of the CFR for receiving the MBS in the non-RRC connected mode is the first frequency location. The terminal receives the MBS at the first frequency location. Or, in response to the predetermined signaling carrying the second information, it is determined that the frequency location of the CFR for receiving the MBS in the non-RRC connected mode is the second frequency location. The terminal receives the MBS at the second frequency location.

In another embodiment, in response to the predetermined signaling not carrying the predetermined information, it is determined that the frequency location of the CFR for receiving the MBS in the non-RRC connected mode is the first frequency location or the second frequency location. The terminal can receive the MBS at the first frequency location or the second frequency location. In this way, the flexibility of the network is increased. When the network wants to obtain high resource utilization, the CFR can be configured at the first frequency location. In this way, a RedCap terminal and a non-RedCap terminal can share the same frequency location of the CFR.

When the network controls the terminal to save energy, the frequency location of the CFR can be configured at the same frequency as the location monitored by the terminal, so as to avoid the terminal from switching between different BWPs, save power consumption of the terminal, and improve the endurance time of the terminal.

It should be noted that those skilled in the art can understand that the method provided in the embodiment of the present disclosure can be executed independently, or can be executed together with some methods in the embodiments of the present disclosure or related technologies.

Figure 8:
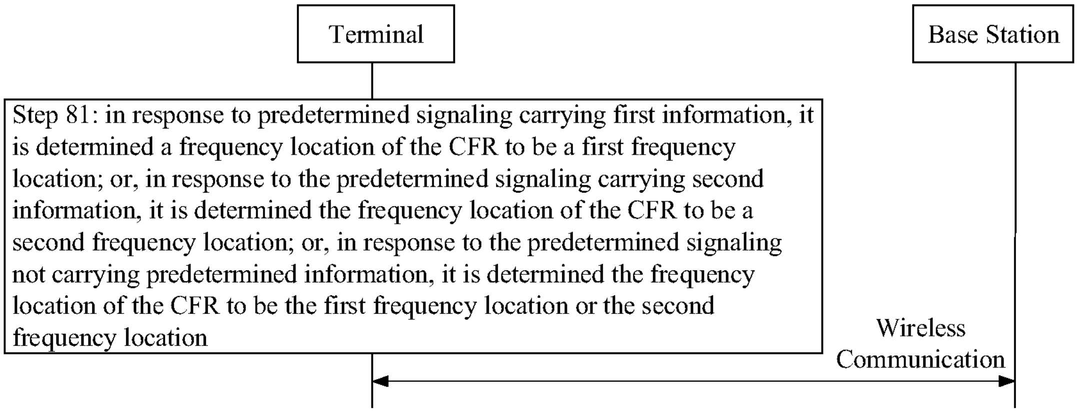
FIG. 8 is a flowchart illustrating a method for determining a CFR for transmitting MBS according to an exemplary embodiment.

As shown in FIG. 8, in this embodiment, a method for determining a CFR for receiving an MBS is provided, performed by a terminal. The method includes step 81.

In step 81, in response to predetermined signaling carrying first information, it is determined that a frequency location of the CFR for receiving the MBS in a non-RRC connected mode is a first frequency location; or, in response to the predetermined signaling carrying second information, it is determined that the frequency location of the CFR for receiving the MBS in the non-RRC connected mode is a second frequency location; or, in response to the predetermined signaling not carrying predetermined information, it is determined that the frequency location of the CFR for receiving the MBS in the non-RRC connected mode is the first frequency location or the second frequency location.

Herein, the first frequency location is a location determined based on a common control resource set (CORESET). The second frequency location is a location determined based on a downlink bandwidth part (BWP).

Herein, the predetermined signaling can carry different types of predetermined information or no predetermined information. Herein, the predetermined information can be the first information or the second information. In an embodiment, in response to the predetermined signaling carrying the first information, it is determined that the frequency location of the CFR for receiving the MBS in the non-RRC connected mode is the first frequency location. The terminal receives the MBS at the first frequency location. Or, in response to the predetermined signaling carrying the second information, it is determined that the frequency location of the CFR for receiving the MBS in the non-RRC connected mode is the second frequency location. The terminal receives the MBS at the second frequency location. In another embodiment, in response to the predetermined signaling not carrying the predetermined information, it is determined that the frequency location of the CFR for receiving the MBS in the non-RRC connected mode is the first frequency location or the second frequency location. The terminal can receive the MBS at the first frequency location or the second frequency location. In this way, the flexibility of the network is increased. When the network wants to obtain high resource utilization, the CFR can be configured at the first frequency location. In this way, a RedCap terminal and a non-RedCap terminal can share the same frequency location of the CFR. When the network controls the terminal to save energy, the frequency location of the CFR can be configured at the same frequency as the location monitored by the terminal, so as to avoid the terminal from switching between different BWPs, save power consumption of the terminal, and improve the endurance time of the terminal.

It should be noted that those skilled in the art can understand that the method provided in the embodiment of the present disclosure can be executed independently, or can be executed together with some methods in the embodiments of the present disclosure or related technologies.

Figure 9:
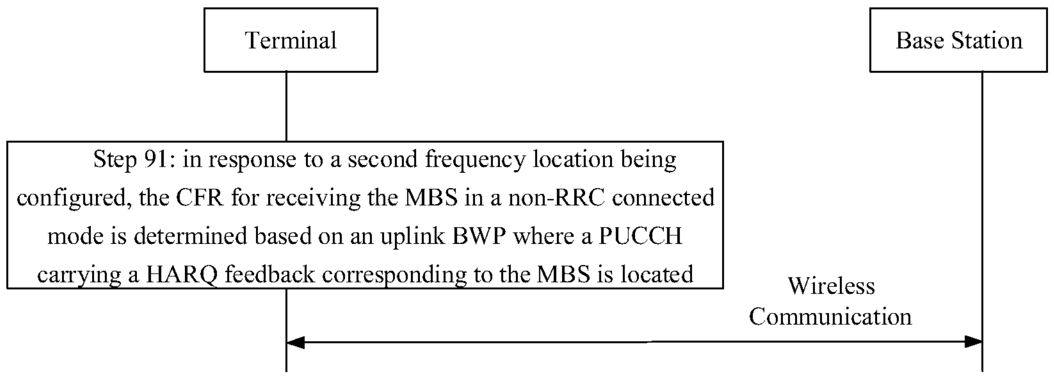
FIG. 9 is a flowchart illustrating a method for determining a CFR for transmitting MBS according to an exemplary embodiment.

As shown in FIG. 9, in this embodiment, a method for determining a CFR for receiving an MBS is provided, performed by a terminal. The method includes step 91.

In step 91, in response to a second frequency location being configured, the CFR for receiving the MBS in a non-RRC connected mode is determined based on an uplink BWP where a physical uplink control channel (PUCCH) carrying a hybrid automatic repeat request (HARQ) feedback corresponding to the MBS is located.

Herein, the second frequency location can be a location determined based on a downlink bandwidth part (BWP).

It should be noted that those skilled in the art can understand that the method provided in the embodiment of the present disclosure can be executed independently, or can be executed together with some methods in the embodiments of the present disclosure or related technologies.

Figure 10:
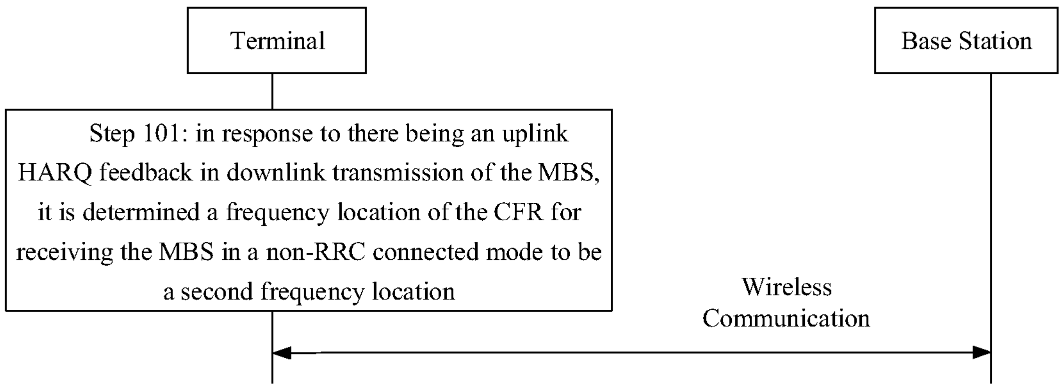
FIG. 10 is a flowchart illustrating a method for determining a CFR for transmitting MBS according to an exemplary embodiment.

As shown in FIG. 10, in this embodiment, a method for determining a CFR for receiving an MBS is provided, performed by a terminal. The method includes step 101.

In step 101: in response to there being an uplink hybrid automatic repeat request (HARQ) feedback in downlink transmission of the MBS, it is determined that a frequency location of the CFR for receiving the MBS in a non-RRC connected mode is a second frequency location.

In an embodiment, the second frequency location is a location with the same center frequency as the uplink BWP.

In an embodiment, in response to the second frequency location being configured, the CFR for receiving the MBS in the non-RRC connected mode is determined based on an uplink (UL) BWP where a physical uplink control channel (PUCCH) carrying a HARQ feedback corresponding to the MBS is located. Herein, in response to there being the uplink HARQ feedback in downlink transmission of the MBS, it can be determined the frequency location of the CFR for receiving the MBS in the non-RRC connected mode to be the second frequency location. The second frequency location is the location with the same center frequency as the uplink BWP. In this way, in the TDD system, it is ensured that UL BWP and DL BWP have the same center frequency. The same center frequency can reduce the need to switch the center frequency when the terminal switches between uplink and downlink, thereby saving power consumption of the terminal and improving endurance time of the terminal.

It should be noted that those skilled in the art can understand that the method provided in the embodiment of the present disclosure can be executed independently, or can be executed together with some methods in the embodiments of the present disclosure or related technologies.

Figure 11:
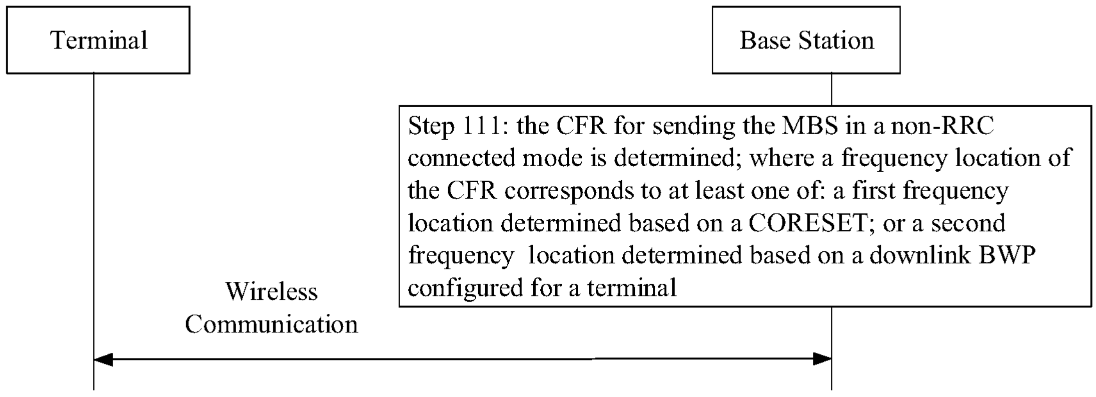
FIG. 11 is a flowchart illustrating a method for determining a CFR for transmitting MBS according to an exemplary embodiment.

As shown in FIG. 11, in this embodiment, a method for determining a CFR for sending an MBS is provided, performed by a base station. The method includes step 111.

In step 111, the CFR for sending the MBS in a non-radio resource control (non-RRC) connected mode is determined.

A frequency location of the CFR corresponds to at least one of the following frequency locations: a first frequency location determined based on a common control resource set (CORESET) or a second frequency location determined based on a downlink bandwidth part (BWP) configured for a terminal.

In an embodiment, the CFR for sending the MBS in the non-RRC connected mode is determined.

The frequency location of the CFR corresponds to the first frequency location determined based on the CORESET and/or the second frequency location determined based on the downlink BWP.

Herein, the terminal can be, but is not limited to, a mobile phone, a tablet computer, a wearable device, a vehicle-mounted terminal, a roadside unit (RSU), a smart home terminal, an industrial sensing device, and/or a medical device. For example, the smart home terminal can include a camera, a temperature acquisition device, a brightness acquisition device, and the like. The terminal can be a RedCap terminal.

Herein, the base station involved in the present disclosure can be a base station of various types, such as a base station of the third generation mobile communication (3G) network, a base station of the fourth generation mobile communication (4G) network, a base station of the fifth generation mobile communication (5G) network, or other evolved base stations.

In a scenario embodiment, after determining the CFR, the base station can distribute the CFR to the terminal. The CFR is used for the terminal to receive the MBS. There is no limitation herein.

Herein, the first frequency location is a location determined based on the CORESET. The second frequency location is a location determined based on the downlink BWP.

In an embodiment, the CFR for sending the MBS in the non-RRC connected mode can be determined from at least one of the first frequency location determined based on the CORESET and the second frequency location determined based on the downlink BWP configured by the base station for the terminal. It should be noted that the frequency location of the determined CFR can be the first frequency location; or, the frequency location of the determined CFR can also be the second frequency location; or, the frequency location of the determined CFR can also be a combination of a part in the first frequency location and a part in the frequency location of the CFR; or, the frequency location of the determined CFR can also be other frequency location associated with the first frequency location and/or the second frequency location. In summary, the frequency location of the CFR is determined based on the first frequency location and the second frequency location, which is not limited herein.

Herein, the non-RRC connected mode can include a RRC idle state and/or a RRC inactive state, but is not limited to the RRC idle state and/or the RRC inactive state. Herein, as the evolution of the network, the non-RRC connected mode can be any state in which no RRC connection is established between the terminal and the base station.

In an embodiment, the CFR for sending the MBS in the RRC idle state is determined. The MBS is sent on the CFR.

In an embodiment, the CFR for sending the MBS in the RRC inactive state is determined. The MBS is sent on the CFR.

Herein, the CORESET for determining the first frequency location can be determined from a plurality of CORESETs. For example, CORESET #0 is determined to be the CORESET for determining the first frequency location from CORESET #0, CORESEET #1, and CORESET #2. It should be noted that the CORESET for determining the first frequency location can be indicated by network configuration, can be configured by default (for example, specified by a predetermined protocol), or can be determined by the terminal based on its own behavior, which is not limited herein.

In an embodiment, based on the determination of whether the network is configured with the second frequency location, the CFR for sending the MBS in the non-RRC connected mode is determined. The frequency location of the CFR corresponds to the first frequency location determined based on the CORESET and/or the second frequency location determined based on the downlink BWP configured by the base station for the terminal.

In an embodiment, in response to the network not being configured with the second frequency location, it is determined that the frequency location of the CFR for sending the MBS in the non-RRC connected mode is the first frequency location. The base station sends the MBS at the first frequency location.

In an embodiment, in response to the network being configured with the second frequency location, the CFR for sending the MBS in the non-RRC connected mode is determined based on a configured frequency resource monitored by the terminal in the non-RRC connected mode. Herein, the CFR for sending the MBS in the non-RRC connected mode can be determined according to whether the network is configured with the frequency resource monitored by the terminal in the non-RRC connected mode.

In an embodiment, in response to the frequency resource monitored by the terminal in the non-RRC connected mode not being configured, it is determined that the frequency location of the CFR for sending the MBS in the non-RRC connected mode is the first frequency location. The base station sends the MBS at the first frequency location.

In an embodiment, in response to the frequency resource monitored by the terminal in the non-RRC connected mode being configured, it is determined that the frequency location of the CFR for sending the MBS in the non-RRC connected mode is the second frequency location. The base station sends the MBS at the second frequency location.

In an embodiment, in response to the second frequency location being configured, the CFR for sending the MBS in the non-RRC connected mode is determined based on an indication of predetermined signaling. Herein, the CFR for sending the MBS in the non-RRC connected mode can be determined based on a type of predetermined information carried by the predetermined signaling.

In an embodiment, in response to the predetermined signaling carrying first information, it is determined that the frequency location of the CFR for sending the MBS in the non-RRC connected mode is the first frequency location. The base station sends the MBS at the first frequency location.

In an embodiment, in response to the predetermined signaling carrying second information, it is determined that the frequency location of the CFR for sending the MBS in the non-RRC connected mode is the second frequency location. The base station sends the MBS at the second frequency location. Herein, the CFR for sending the MBS in the non-RRC connected mode can be determined based on whether the predetermined signaling carries predetermined information.

In an embodiment, in response to the predetermined signaling not carrying the predetermined information, it is determined that the frequency location of the CFR for sending the MBS in the non-RRC connected mode is the first frequency location or the second frequency location. The base station can send the MBS at the first frequency location or the second frequency location.

In an embodiment, in response to the second frequency location being configured, the CFR for sending the MBS in the non-RRC connected mode is determined based on an uplink BWP where a physical uplink control channel (PUCCH) carrying a hybrid automatic repeat request (HARQ) feedback corresponding to the MBS is located. Herein, in response to there being an uplink HARQ feedback in downlink transmission of the MBS, it can be determined that the frequency location of the CFR for sending the MBS in the non-RRC connected mode is the second frequency location. The second frequency location is a location with the same center frequency as the uplink BWP.

It should be noted that those skilled in the art can understand that the method provided in the embodiment of the present disclosure can be executed independently, or can be executed together with some methods in the embodiments of the present disclosure or related technologies.

Figure 12:
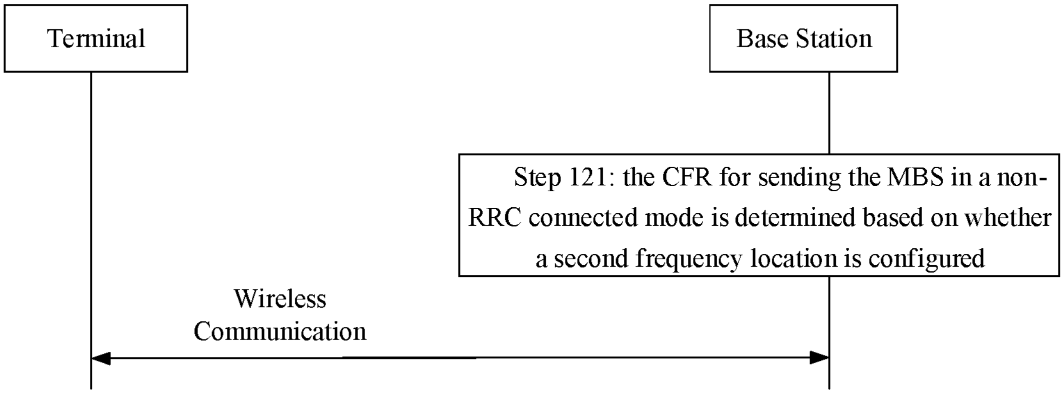
FIG. 12 is a flowchart illustrating a method for determining a CFR for transmitting MBS according to an exemplary embodiment.

As shown in FIG. 12, in this embodiment, a method for determining a CFR for sending an MBS is provided, performed by a base station. The method includes step 121.

Step 121, the CFR for sending the MBS in a non-RRC connected mode is determined based on whether a second frequency location is configured.

Herein, the second frequency location is a location determined based on a downlink (DL) BWP.

In an embodiment, in response to the network not being configured with the second frequency location, it is determined that the frequency location of the CFR for sending the MBS in the non-RRC connected mode is the first frequency location. The base station sends the MBS at the first frequency location.

In an embodiment, in response to the network being configured with the second frequency location, the CFR for sending the MBS in the non-RRC connected mode is determined based on a configured frequency resource monitored by the terminal in the non-RRC connected mode. Herein, the frequency resource monitored by the terminal in the non-RRC connected mode can indicate that the frequency resource monitored by the terminal in the non-RRC connected mode is configured or that the frequency resource monitored by the terminal in the non-RRC connected mode is not configured.

In an embodiment, in response to the frequency resource monitored by the terminal in the non-RRC connected mode not being configured, it is determined that the frequency location of the CFR for sending the MBS in the non-RRC connected mode is the first frequency location. The base station sends the MBS at the first frequency location. In some possible embodiments, in response to the frequency resource monitored by the terminal in the non-RRC connected mode being configured, it is determined that the frequency location of the CFR for sending the MBS in the non-RRC connected mode is the second frequency location. The base station sends the MBS at the second frequency location. In this way, when receiving an MBS downlink service, the terminal does not need to switch back and forth between the first frequency location and the second frequency location, which can save the power consumption of the terminal and improve the endurance time of the terminal.

In an embodiment, in response to the second frequency location being configured, the CFR for sending the MBS in the non-RRC connected mode is determined based on an indication of predetermined signaling. Herein, the predetermined signaling can carry different types of predetermined information or no predetermined information. Herein, the predetermined information can be first information or second information.

In an embodiment, in response to the predetermined signaling carrying the first information, it is determined the frequency location of the CFR for sending the MBS in the non-RRC connected mode to be the first frequency location. The base station sends the MBS at the first frequency location. Or, in response to the predetermined signaling carrying the second information, it is determined the frequency location of the CFR for sending the MBS in the non-RRC connected mode to be the second frequency location. The base station sends the MBS at the second frequency location.

In another embodiment, in response to the predetermined signaling not carrying the predetermined information, it is determined the frequency location of the CFR for sending the MBS in the non-RRC connected mode to be the first frequency location or the second frequency location. The base station can send the MBS at the first frequency location or the second frequency location. In this way, the flexibility of the network is increased. When the network wants to obtain high resource utilization, the CFR can be configured at the first frequency location. In this way, a RedCap terminal and a non-RedCap terminal can share the same frequency location of the CFR. When the network control the terminal to save energy, the frequency location of the CFR can be configured at the same frequency as the location monitored by the terminal, so as to avoid the terminal from switching between different BWPs, save power consumption of the terminal and improve endurance time of the terminal.

In an embodiment, in response to the second frequency location being configured, the CFR for sending the MBS in the non-RRC connected mode is determined based on an uplink (UL) BWP where a physical uplink control channel (PUCCH) carrying a hybrid automatic repeat request (HARQ) feedback corresponding to the MBS is located. Herein, in response to there being an uplink HARQ feedback in downlink transmission of the MBS, it can be determined that the frequency location of the CFR for sending the MBS in the non-RRC connected mode is the second frequency location. The second frequency location is a location with the same center frequency as the uplink BWP. In this way, in the TDD system, it is ensured that UL BWP and DL BWP have the same center frequency. The same center frequency can reduce the need to switch the center frequency when the terminal switches between uplink and downlink, thereby saving power consumption of the terminal and improving the endurance time of the terminal.

In an embodiment of the present disclosure, the CFR for sending the MBS in the non-RRC connected mode can be adapted to the second frequency location, so that the network configuration is more flexible.

It should be noted that those skilled in the art can understand that the method provided in the embodiment of the present disclosure can be executed independently, or can be executed together with some methods in the embodiments of the present disclosure or related technologies.

Figure 13:
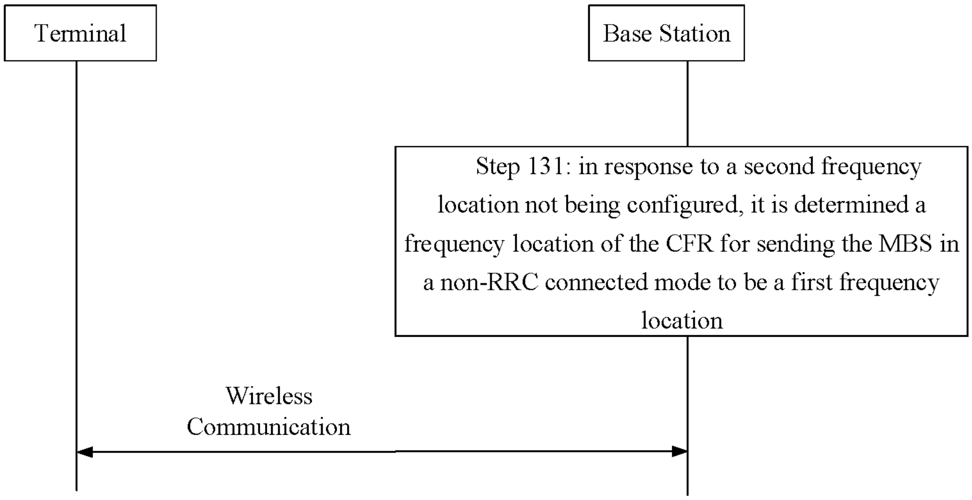
FIG. 13 is a flowchart illustrating a method for determining a CFR for transmitting MBS according to an exemplary embodiment.

As shown in FIG. 13, in this embodiment, a method for determining a CFR for sending an MBS is provided, performed by a base station. The method includes step 131.

In step 131, in response to a second frequency location not being configured, it is determined that a frequency location of the CFR for sending the MBS in a non-RRC connected mode is a first frequency location.

Herein, the first frequency location is a location determined based on a common control resource set (CORESET). The second frequency location is a location determined based on a downlink bandwidth part (BWP).

It should be noted that those skilled in the art can understand that the method provided in the embodiment of the present disclosure can be executed independently, or can be executed together with some methods in the embodiments of the present disclosure or related technologies.

Figure 14:
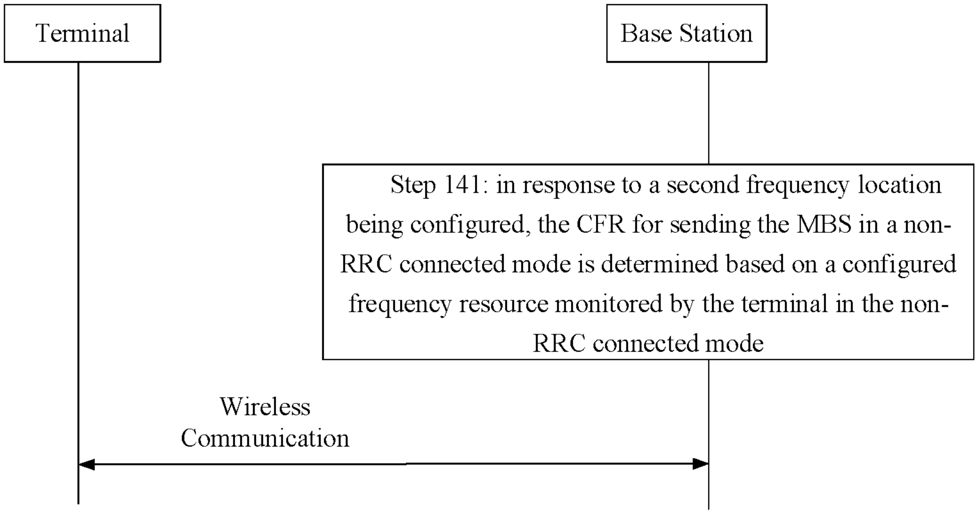
FIG. 14 is a flowchart illustrating a method for determining a CFR for transmitting MBS according to an exemplary embodiment.

As shown in FIG. 14, in this embodiment, a method for determining a CFR for sending an MBS is provided, performed by a base station. The method includes step 141.

In step 141, in response to a second frequency location being configured, the CFR for sending the MBS in a non-RRC connected mode is determined based on a configured frequency resource monitored by the terminal in the non-RRC connected mode.

Herein, the second frequency location is a location determined based on a downlink bandwidth part (BWP).

In an embodiment, in response to the frequency resource monitored by the terminal in the non-RRC connected mode not being configured, it is determined that the frequency location of the CFR for sending the MBS in the non-RRC connected mode is the first frequency location. The base station sends the MBS at the first frequency location. In some possible embodiments, in response to the frequency resource monitored by the terminal in the non-RRC connected mode being configured, it is determined that the frequency location of the CFR for sending the MBS in the non-RRC connected mode is the second frequency location. The base station sends the MBS at the second frequency location.

In this way, when receiving an MBS downlink service, the terminal does not need to switch back and forth between the first frequency location and the second frequency location, which can save the power consumption of the terminal and improve the endurance time of the terminal.

It should be noted that those skilled in the art can understand that the method provided in the embodiment of the present disclosure can be executed independently, or can be executed together with some methods in the embodiments of the present disclosure or related technologies.

Figure 15:
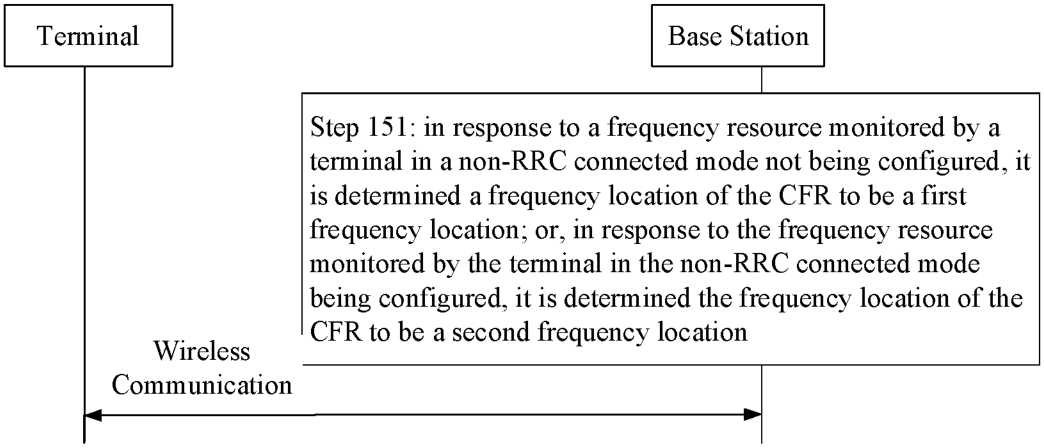
FIG. 15 is a flowchart illustrating a method for determining a CFR for transmitting MBS according to an exemplary embodiment.

As shown in FIG. 15, in this embodiment, a method for determining a CFR for sending an MBS is provided, performed by a base station. The method includes step 151.

In step 151, in response to a frequency resource monitored by a terminal in a non-RRC connected mode not being configured, it is determined that a frequency location of the CFR for sending the MBS in the non-RRC connected mode is a first frequency location, or in response to the frequency resource monitored by the terminal in the non-RRC connected mode being configured, it is determined that the frequency location of the CFR for sending the MBS in the non-RRC connected mode is a second frequency location.

Herein, the first frequency location is a location determined based on a common control resource set (CORESET). The second frequency location is a location determined based on a downlink bandwidth part (BWP).

In an embodiment, it is determined whether the frequency resource monitored by the terminal in the non-RRC connected mode is configured. In response to the frequency resource monitored by the terminal in the non-RRC connected mode not being configured, it is determined that the frequency location of the CFR for sending the MBS in the non-RRC connected mode is the first frequency location. The base station sends the MBS at the first frequency location. Or, in response to the frequency resource monitored by the terminal in the non-RRC connected mode being configured, it is determined that the frequency location of the CFR for sending the MBS in the non-RRC connected mode is the second frequency location. The base station sends the MBS at the second frequency location. In this way, when receiving an MBS downlink service, the terminal does not need to switch back and forth between the first frequency location and the second frequency location, which can save the power consumption of the terminal and improve the endurance time of the terminal.

It should be noted that those skilled in the art can understand that the method provided in the embodiment of the present disclosure can be executed independently, or can be executed together with some methods in the embodiments of the present disclosure or related technologies.

Figure 16:
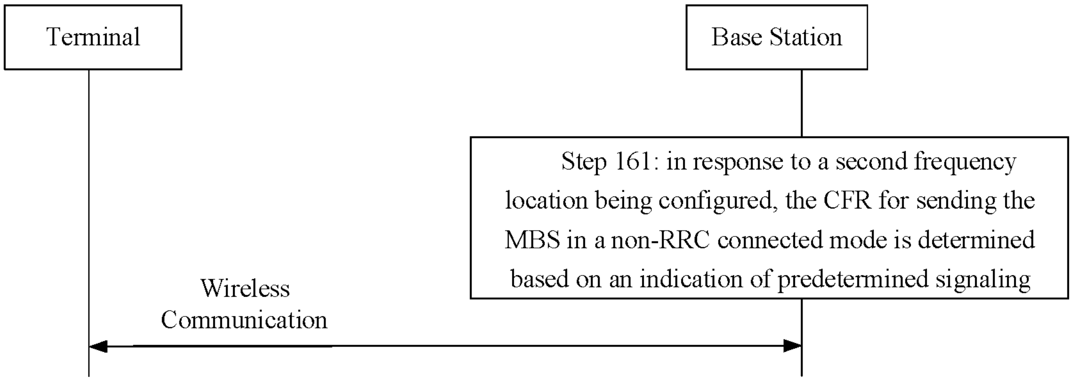
FIG. 16 is a flowchart illustrating a method for determining a CFR for transmitting MBS according to an exemplary embodiment.

As shown in FIG. 16, in this embodiment, a method for determining a CFR for sending an MBS is provided, performed by a base station. The method includes step 161.

In step 161, in response to a second frequency location being configured, the CFR for sending the MBS in a non-RRC connected mode is determined based on an indication of predetermined signaling.

Herein, the second frequency location can be a location determined based on a downlink bandwidth part (BWP).

In an embodiment, in response to the second frequency location being configured, the CFR for sending the MBS in the non-RRC connected mode is determined based on an indication of predetermined signaling. Herein, the predetermined signaling can carry different types of predetermined information or no predetermined information. Herein, the predetermined information can be first information or second information.

In an embodiment, in response to the predetermined signaling carrying the first information, it is determined that the frequency location of the CFR for sending the MBS in the non-RRC connected mode is the first frequency location. The base station sends the MBS at the first frequency location. Or, in response to the predetermined signaling carrying the second information, it is determined that the frequency location of the CFR for sending the MBS in the non-RRC connected mode is the second frequency location. The base station sends the MBS at the second frequency location.

In another embodiment, in response to the predetermined signaling not carrying the predetermined information, it is determined that the frequency location of the CFR for sending the MBS in the non-RRC connected mode is the first frequency location or the second frequency location. The base station can send the MBS at the first frequency location or the second frequency location. In this way, the flexibility of the network is increased. When the network wants to obtain high resource utilization, the CFR can be configured at the first frequency location. In this way, a RedCap terminal and a non-RedCap terminal can share the same frequency location of the CFR. When the network controls the terminal to save energy, the frequency location of the CFR can be configured at the same frequency as the location monitored by the terminal, so as to avoid the terminal from switching between different BWPs, save power consumption of the terminal, and improve the endurance time of the terminal.

It should be noted that those skilled in the art can understand that the method provided in the embodiment of the present disclosure can be executed independently, or can be executed together with some methods in the embodiments of the present disclosure or related technologies.

Figure 17:
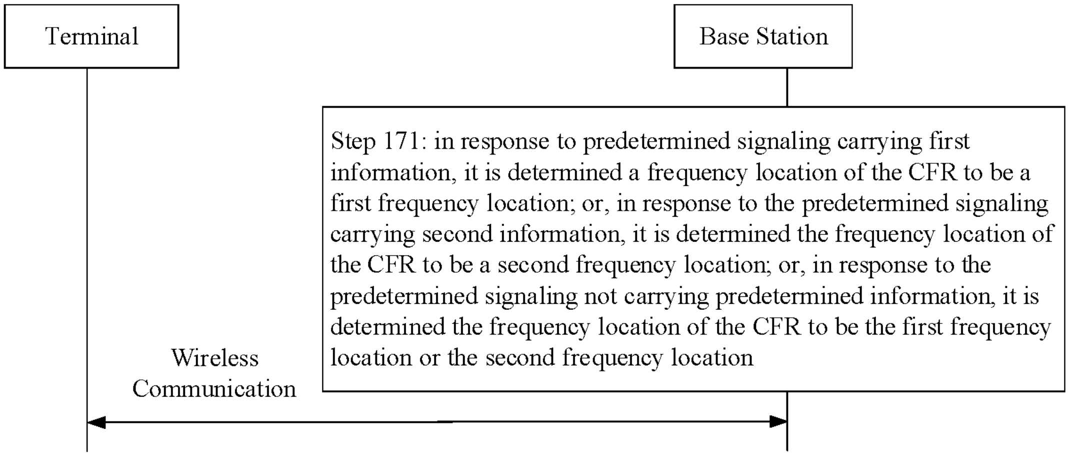
FIG. 17 is a flowchart illustrating a method for determining a CFR for transmitting MBS according to an exemplary embodiment.

As shown in FIG. 17, in this embodiment, a method for determining a CFR for sending an MBS is provided, performed by a base station. The method includes step 171.

In step 171: in response to predetermined signaling carrying first information, it is determined that a frequency location of the CFR for sending the MBS in a non-RRC connected mode is a first frequency location; or, in response to the predetermined signaling carrying second information, it is determined that the frequency location of the CFR for sending the MBS in the non-RRC connected mode is a second frequency location; or, in response to the predetermined signaling not carrying predetermined information, it is determined that the frequency location of the CFR for sending the MBS in the non-RRC connected mode is the first frequency location or the second frequency location.

Herein, the first frequency location is a location determined based on a common control resource set (CORESET). The second frequency location is a location determined based on a downlink bandwidth part (BWP).

Herein, the predetermined signaling can carry different types of predetermined information or no predetermined information. Herein, the predetermined information can be the first information or the second information. In an embodiment, in response to the predetermined signaling carrying the first information, it is determined that the frequency location of the CFR for sending the MBS in the non-RRC connected mode is the first frequency location. The base station sends the MBS at the first frequency location. Or, in response to the predetermined signaling carrying the second information, it is determined that the frequency location of the CFR for sending the MBS in the non-RRC connected mode is the second frequency location. The base station sends the MBS at the second frequency location. In another embodiment, in response to the predetermined signaling not carrying the predetermined information, it is determined that the frequency location of the CFR for sending the MBS in the non-RRC connected mode is the first frequency location or the second frequency location. The base station can send the MBS at the first frequency location or the second frequency location. In this way, the flexibility of the network is increased. When the network wants to obtain high resource utilization, the CFR can be configured at the first frequency location. In this way, a RedCap terminal and a non-RedCap terminal can share the same frequency location of the CFR. When the network controls the terminal to save energy, the frequency location of the CFR can be configured at the same frequency as the location monitored by the terminal, so as to avoid the terminal from switching between different BWPs, save power consumption of the terminal, and improve the endurance time of the terminal.

It should be noted that those skilled in the art can understand that the method provided in the embodiment of the present disclosure can be executed independently, or can be executed together with some methods in the embodiments of the present disclosure or related technologies.

Figure 18:
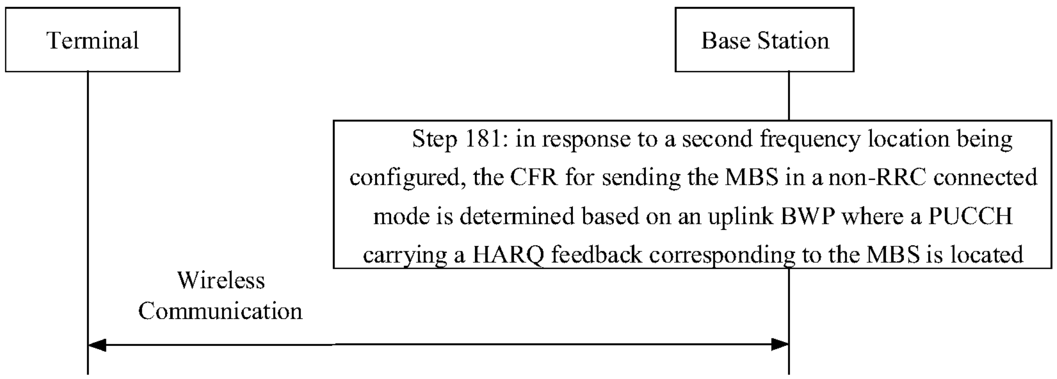
FIG. 18 is a flowchart illustrating a method for determining a CFR for transmitting MBS according to an exemplary embodiment.

As shown in FIG. 18, in this embodiment, a method for determining a CFR for sending an MBS is provided, performed by a base station. The method includes step 181.

In step 181, in response to a second frequency location being configured, the CFR for sending the MBS in a non-RRC connected mode is determined based on an uplink BWP where a physical uplink control channel (PUCCH) carrying a hybrid automatic repeat request (HARQ) feedback corresponding to the MBS is located.

Herein, the second frequency location can be a location determined based on a downlink bandwidth part (BWP).

It should be noted that those skilled in the art can understand that the method provided in the embodiment of the present disclosure can be executed independently, or can be executed together with some methods in the embodiments of the present disclosure or related technologies.

Figure 19:
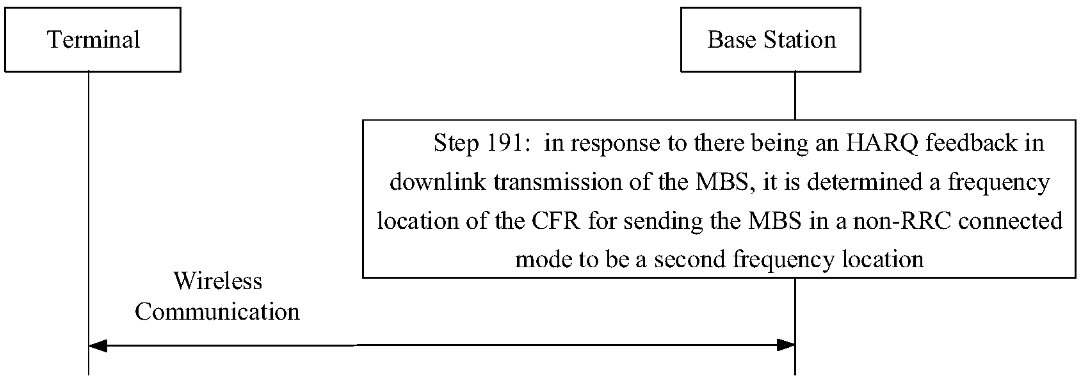
FIG. 19 is a flowchart illustrating a method for determining a CFR for transmitting MBS according to an exemplary embodiment.

As shown in FIG. 19, in this embodiment, a method for determining a CFR for sending an MBS is provided, performed by a base station. The method includes step 191.

In step 191, in response to there being an uplink hybrid automatic repeat request (HARQ) feedback in downlink transmission of the MBS, it is determined that a frequency location of the CFR for sending the MBS in a non-RRC connected mode is a second frequency location.

In an embodiment, the second frequency location is a location with the same center frequency as the uplink BWP.

Herein, the second frequency location is a location determined based on a downlink BWP.

In an embodiment, in response to the second frequency location being configured, the CFR for sending the MBS in the non-RRC connected mode is determined based on an uplink (UL) BWP where a physical uplink control channel (PUCCH) carrying a HARQ feedback corresponding to the MBS is located. Herein, in response to the uplink HARQ feedback being in the downlink transmission of the MBS, it can be determined that the frequency location of the CFR for sending the MBS in the non-RRC connected mode is the second frequency location. The second frequency location is the location with the same center frequency as the uplink BWP. In this way, in the TDD system, it is ensured that UL BWP and DL BWP have the same center frequency. The same center frequency can reduce the need to switch the center frequency when the terminal switches between uplink and downlink, thereby saving power consumption of the terminal, and improving the endurance time of the terminal.

It should be noted that those skilled in the art can understand that the method provided in the embodiment of the present disclosure can be executed independently, or can be executed together with some methods in the embodiments of the present disclosure or related technologies.

Figure 20:
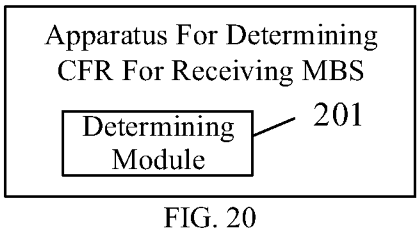
FIG. 20 is a schematic diagram illustrating an apparatus for determining a CFR for transmitting MBS according to an exemplary embodiment.

As shown in FIG. 20, in this embodiment, an apparatus for determining a common frequency resource (CFR) for receiving a multicast and broadcast service (MBS) is provided. The apparatus includes a determining module 201.

The determining module 201 is configured to determine the CFR for receiving the MBS in non-radio resource control (non-RRC) connected mode.

A frequency location of the CFR corresponds to at least one of a first frequency location determined based on a common control resource set (CORESET) or a second frequency location determined based on a downlink bandwidth part (BWP) configured for a terminal.

It should be noted that those skilled in the art can understand that the method provided in the embodiment of the present disclosure can be executed independently, or can be executed together with some methods in the embodiments of the present disclosure or related technologies.

Figure 21:
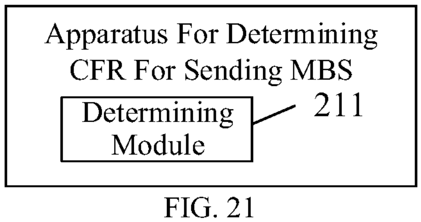
FIG. 21 is a schematic diagram illustrating an apparatus for determining a CFR for transmitting MBS according to an exemplary embodiment.

As shown in FIG. 21, in this embodiment, an apparatus for determining a common frequency resource (CFR) for sending a multicast and broadcast service (MBS) is provided. The apparatus includes a determining module 211.

The determining module 211 is configured to determine the CFR for sending the MBS in a non-radio resource control (non-RRC) connected mode.

A frequency location of the CFR corresponds to at least one of a first frequency location determined based on a common control resource set (CORESET) or a second frequency location determined based on a downlink bandwidth part (BWP) configured for a terminal.

It should be noted that those skilled in the art can understand that the method provided in the embodiment of the present disclosure can be executed independently, or can be executed together with some methods in the embodiments of the present disclosure or related technologies.

An embodiment of the present disclosure provides a communication device, including one or more processors and a memory configured to store instructions executable by the one or more processors. The processors are configured to execute the instructions to perform the method according to any embodiment of the present disclosure.

The processors can include various types of storage media. The storage media are non-transitory computer storage media that can continue to remember information stored on a communication device after a power failure.

The processors can be connected to the memory through a bus or the like to read executable programs stored on the memory.

An embodiment of the present disclosure also provides a computer storage medium storing a computer executable program which, when executed by a processor, implements the method according to any one of the embodiments of the present disclosure.

Regarding the apparatuses in the above embodiments, the specific ways in which each module performs operations have been described in detail in the relevant embodiments of the methods, and will not be described in detail herein.

Figure 22:
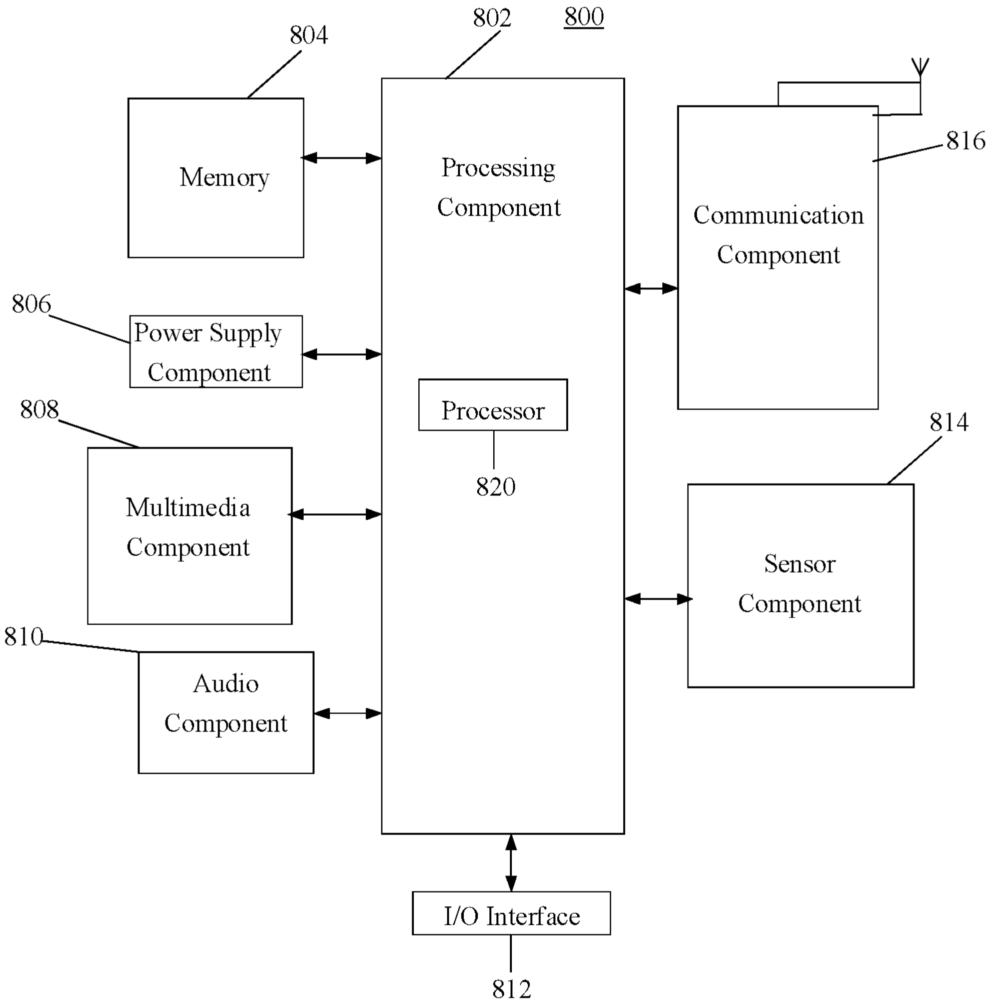
FIG. 22 is a schematic structural diagram illustrating a terminal according to an exemplary embodiment.

As shown in FIG. 22, an embodiment of the present disclosure provides a structure of a terminal.

As shown in FIG. 22, this embodiment provides a terminal 800. The terminal 800 can specifically be a mobile phone, a computer, a digital broadcasting terminal, a messaging device, a game console, a tablet device, a medical device, a fitness device, a personal digital assistant, or the like.

Referring to FIG. 22, the terminal 800 can include one or more of the following components: a processing component 802, a memory 804, a power supply component 806, a multimedia component 808, an audio component 810, an input/output (I/O) interface 812, a sensor component 814, and a communication component 816.

The processing component 802 generally controls overall operations of the terminal 800, such as operations associated with display, phone calls, data communication, camera operations, and recording operations. The processing component 802 can include one or more processors 820 to execute instructions to complete all or part of the steps of the above methods. In addition, the processing component 802 can include one or more modules which facilitate the interaction between the processing component 802 and other components. For example, the processing component 802 can include a multimedia module to facilitate the interaction between the multimedia component 808 and the processing component 802.

The memory 804 is configured to store various types of data to support the operation of the terminal 800. Examples of such data include instructions for any application or method operated on the terminal 800, contact data, phonebook data, messages, pictures, videos, and so on. The memory 804 can be implemented by any type of volatile or non-volatile storage devices or a combination thereof, such as a Static Random Access Memory (SRAM), an Electrically Erasable Programmable Read Only Memory (EEPROM), an Erasable Programmable Read Only Memory (EPROM), a Programmable Read Only memory (PROM), a Read Only Memory (ROM), a magnetic memory, a flash memory, a magnetic or an optical disk.

The power supply component 806 provides power to various components of the terminal 800. The power supply component 806 can include a power management system, one or more power supplies, and other components associated with generating, managing, and distributing power for the terminal 800.

The multimedia component 808 includes a screen providing an output interface between the terminal 800 and a user. In some examples, the screen may include a liquid crystal display (LCD) and a touch panel (TP). If the screen includes the TP, the screen can be implemented as a touch screen to receive input signals from the user. The TP includes one or more touch sensors to sense touches, swipes, and gestures on the TP. The touch sensor can not only sense a boundary of a touch or swipe, but also sense a lasting time and a pressure associated with the touch or swipe. In some embodiments, the multimedia component 808 can include a front camera and/or a rear camera. The front camera and/or rear camera can receive external multimedia data when the terminal 800 is in an operating mode, such as a photographing mode or a video mode. Each of the front camera and the rear camera can be a fixed optical lens system or have focal length and optical zooming capability.

The audio component 810 is configured to output and/or input an audio signal. For example, the audio component 810 includes a microphone (MIC). When the terminal 800 is in an operating mode, such as a call mode, a recording mode, and/or a voice recognition mode, the MIC is configured to receive an external audio signal. The received audio signal may be further stored in the memory 804 or transmitted via the communication component 816. In some embodiments, the audio component 810 further includes a speaker to output an audio signal.

The I/O interface 812 can provide an interface between the processing component 802 and peripheral interface modules. The above peripheral interface modules can include a keyboard, a click wheel, buttons, and so on. These buttons can include, but are not limited to, a home button, a volume button, a start button, and a lock button.

The sensor component 814 includes one or more sensors to provide status assessments of various aspects for the terminal 800. For example, the sensor component 814 can detect the on/off status of the terminal 800, and the relative positioning of the component, for example, the component is a display and a keypad of the terminal 800. The sensor component 814 may also detect a change in position of the terminal 800 or a component of the terminal 800, a presence or absence of the contact between a user and the terminal 800, an orientation or an acceleration/deceleration of the terminal 800, and a change in temperature of the terminal 800. The sensor component 814 can include a proximity sensor configured to detect the presence of a nearby object without any physical contact. The sensor component 814 can further include an optical sensor, such as a Complementary Metal Oxide Semiconductor (CMOS) or Charge-coupled Device (CCD) image sensor, which is used in imaging applications. In some embodiments, the sensor component 814 can further include an acceleration sensor, a gyroscope sensor, a magnetic sensor, a pressure sensor, or a temperature sensor.

The communication component 816 is configured to facilitate wired or wireless communication between the terminal 800 and other devices. The terminal 800 can access a wireless network that is based on communication standards, such as Wi-Fi, 2G, 3G, or a combination thereof. In an exemplary embodiment, the communication component 816 receives a broadcast signal or broadcast-associated information from an external broadcast management system via a broadcast channel. In an exemplary embodiment, the communication component 816 further includes a Near Field Communication (NFC) module to facilitate short-range paging. For example, the NFC module can be implemented based on Radio Frequency Identification (RFID) technology, an Infrared Data Association (IrDA) technology, an Ultra-Wide Band (UWB) technology, a Bluetooth (BT) technology, and/or other technologies.

In an exemplary embodiment, the terminal 800 can be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the described methods.

In an exemplary embodiment, there is also provided a non-transitory machine-readable storage medium including instructions, such as the memory 804, including instructions. The instructions may be executed by the processor 820 of the terminal 800 to perform the methods. For example, the non-transitory machine-readable storage medium can be a ROM, a Random Access Memory (RAM), a CD-ROM, a magnetic tape, a floppy disk, an optical data storage device, and the like.

Figure 23:
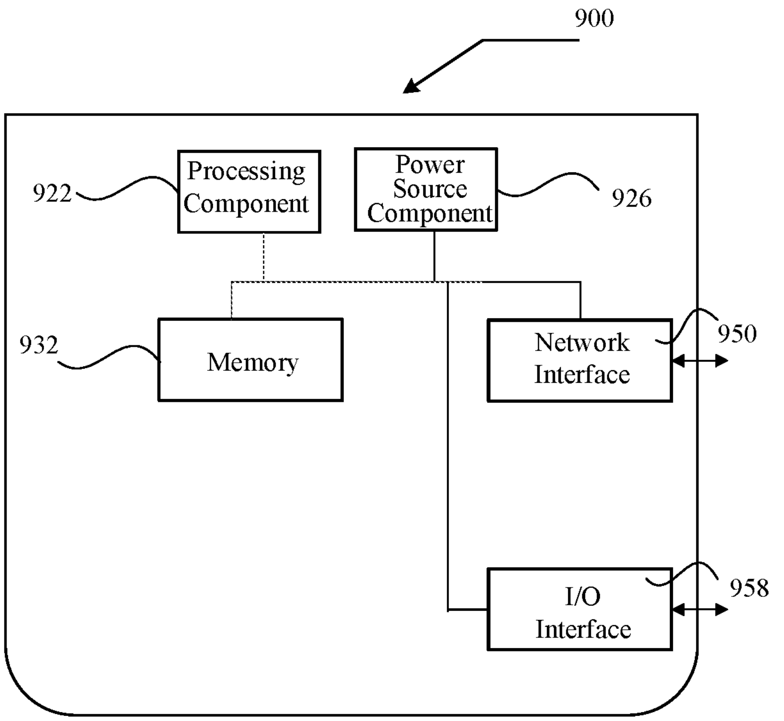
FIG. 23 is a block diagram illustrating a base station according to an exemplary embodiment.

As shown in FIG. 23, an embodiment of the present disclosure illustrates the structure of a base station. For example, the base station 900 can be provided as a network-side device. Referring to FIG. 23, the base station 900 includes a processing component 922, which further includes one or more processors, and a memory resource represented by a memory 932, configured to store instructions such as application programs executable by the processing component 922. The application programs stored in the memory 932 can include one or more than one modules, each of which corresponds to a set of instructions. In addition, the processing component 922 is configured to execute the instructions to perform any of the above methods applied to the base station.

The base station 900 can further include a power source component 926 configured to execute power management of the base station 900, a wired or wireless network interface 950 configured to connect the base station 900 to a network, and an I/O interface 958. The base station 900 can be operated on the basis of an operating system stored in the memory 932, such as Windows Server™, Mac OS X™, Unix™, Linux™, FreeBSD™, or the like.

Other implementations of the present disclosure will be apparent to those skilled in the art from consideration of the specification and practice of the present disclosure herein.

The present disclosure is intended to cover any variations, uses, adaptive changes of the embodiments of the present disclosure that follow the general principles thereof and include common knowledge or conventional technical means in the art that are not disclosed in the present disclosure. The specification and embodiments are considered as exemplary only, with a true scope and spirit of the embodiments of the present disclosure being indicated by the following claims. It should be understood that the present disclosure is not limited to the described structures shown in the drawings, and various modifications and changes can be made to the present disclosure without departing from the scope thereof. The scope of the embodiments of the present disclosure is limited only by the appended claims.

The invention claimed is:

1. A method for determining a common frequency resource (CFR) for receiving a multicast and broadcast service (MBS), performed by a terminal, comprising:
   determining the CFR for receiving the MBS,
   wherein a frequency location of the CFR corresponds to at least one of:
      a first frequency location determined based on a common control resource set (CORESET), or
      a second frequency location determined based on a downlink bandwidth part (BWP) configured for the terminal, and
   wherein determining the CFR for receiving the MBS comprises:
      in response to the second frequency location not being configured, determining the frequency location of the CFR to be the first frequency location.

2. The method according to claim 1, wherein the terminal is a reduced capability (Redcap) terminal.

3. The method according to claim 1, wherein determining the CFR for receiving the MBS further comprises:
   in response to the second frequency location being configured, determining the CFR based on a configured frequency resource monitored by the terminal.

4. The method according to claim 3, wherein determining the CFR based on the configured frequency resource monitored by the terminal comprises:
   in response to the configured frequency resource monitored by the terminal not being configured, determining the frequency location of the CFR to be the first frequency location, or
   in response to the configured frequency resource monitored by the terminal being configured, determining the frequency location of the CFR to be the second frequency location.

5. The method according to claim 1, wherein determining the CFR for receiving the MBS further comprises:
   in response to the second frequency location being configured, determining the CFR based on an indication of predetermined signaling, and
   wherein determining the CFR based on the indication of the predetermined signaling comprises:
      in response to the predetermined signaling carrying first information, determining the frequency location of the CFR to be the first frequency location,
      in response to the predetermined signaling carrying second information, determining the frequency location of the CFR to be the second frequency location, or
      in response to the predetermined signaling not carrying predetermined information, determining the frequency location of the CFR to be the first frequency location or the second frequency location.

6. The method according to claim 1, wherein determining the CFR for receiving the MBS further comprises:
   in response to the second frequency location being configured, determining the CFR based on an uplink BWP where a physical uplink control channel (PUCCH) carrying a hybrid automatic repeat request (HARQ) feedback corresponding to the MBS is located,
   wherein determining the CFR based on the uplink BWP where the PUCCH carrying the HARQ feedback corresponding to the MBS is located, comprises:
      in response to there being an uplink HARQ feedback in downlink transmission of the MBS, determining the frequency location of the CFR to be the second frequency location; and
   wherein the second frequency location is a location with a same center frequency as the uplink BWP.

7. A method for determining a common frequency resource (CFR) for sending a multicast and broadcast service (MBS), performed by a base station, comprising:
   determining the CFR for sending the MBS
   wherein a frequency location of the CFR corresponds to at least one of:
      a first frequency location determined based on a common control resource set (CORESET), or
      a second frequency location determined based on a downlink bandwidth part (BWP) configured for a terminal, and
   wherein determining the CFR for receiving the MBS comprises:
      in response to the second frequency location not being configured, determining the frequency location of the CFR to be the first frequency location.

8. The method according to claim 7, wherein the terminal is a reduced capability (Redcap) terminal.

9. The method according to claim 7, wherein determining the CFR for sending the MBS further comprises:
   in response to the second frequency location being configured, determining the CFR based on a configured frequency resource monitored by the terminal.

10. The method according to claim 9, wherein determining the CFR based on the configured frequency resource monitored by the terminal comprises:
   in response to the configured frequency resource monitored by the terminal not being configured, determining the frequency location of the CFR to be the first frequency location, or
   in response to the configured frequency resource monitored by the terminal being configured, determining the frequency location of the CFR to be the second frequency location.

11. The method according to claim 7, wherein determining the CFR for sending the MBS further comprises:
   in response to the second frequency location being configured, determining the CFR based on an indication of predetermined signaling, and
   wherein determining the CFR based on the indication of the predetermined signaling comprises:
      in response to the predetermined signaling carrying first information, determining the frequency location of the CFR to be the first frequency location,
      in response to the predetermined signaling carrying second information, determining the frequency location of the CFR to be the second frequency location, or in response to the predetermined signaling not carrying predetermined information, determining the frequency location of the CFR to be the first frequency location or the second frequency location.

12. The method according to claim 7, wherein determining the CFR for sending the MBS further comprises:

in response to the second frequency location being configured, determining the CFR based on an uplink BWP where a physical uplink control channel (PUCCH) carrying a hybrid automatic repeat request (HARQ) feedback corresponding to the MBS is located, wherein determining the CFR based on the uplink BWP where the PUCCH carrying the HARQ feedback corresponding to the MBS is located, comprises:

in response to there being an uplink HARQ feedback in downlink transmission of the MBS, determining the frequency location of the CFR to be the second frequency location, and wherein the second frequency location is a location with a same center frequency as the uplink BWP.

13. A communication device, comprising:

a memory; and one or more processors, connected to the memory, configured to execute computer executable instructions stored on the memory to perform operations comprising:

determining a common frequency resource (CFR) for receiving a multicast and broadcast service (MBS), wherein a frequency location of the CFR corresponds to at least one of:

a first frequency location determined based on a common control resource set (CORESET), or a second frequency location determined based on a downlink bandwidth part (BWP) configured for a terminal, and in response to the second frequency location not being configured, determining the frequency location of the CFR to be the first frequency location.

14. A communication device, comprising:

a memory; and one or more processors, connected to the memory, configured to execute computer executable instructions stored on the memory to implement the method according to claim 7.

15. A non-transitory computer-readable storage medium, storing computer executable instructions which, when executed by a processor, cause the processor to perform the method according to claim 1.

16. A non-transitory computer-readable storage medium, storing computer executable instructions which, when executed by a processor, cause the processor to perform the method according to claim 7.

* * * * *